REPRODUCING ENGINEERING DATA

Original Filed Aug. 19, 1943 8 Sheets-Sheet 1

INVENTOR.
Carl K. Stewart
BY Barnes, Kisselle, Laughlin & Raisch
Attorneys.

Sept. 16, 1958 C. K. STEWART 2,852,373

REPRODUCING ENGINEERING DATA

Original Filed Aug. 19, 1943 8 Sheets-Sheet 2

INVENTOR.
Carl K. Stewart
BY Barnes, Kisselle, Laughlin & Raisch
Attorneys.

Sept. 16, 1958 C. K. STEWART 2,852,373

REPRODUCING ENGINEERING DATA

Original Filed Aug. 19, 1943 8 Sheets-Sheet 3

INVENTOR.
Carl K. Stewart
BY Barnes, Kisselle, Laughlin & Raisch
Attorneys.

Sept. 16, 1958

C. K. STEWART 2,852,373

REPRODUCING ENGINEERING DATA

Original Filed Aug. 19, 1943

8 Sheets-Sheet 4

INVENTOR.
Carl K. Stewart
BY Barnes, Kisselle, Laughlin & Raisch
Attorneys.

Sept. 16, 1958 C. K. STEWART 2,852,373

REPRODUCING ENGINEERING DATA

Original Filed Aug. 19, 1943 8 Sheets-Sheet 5

INVENTOR.
Carl K. Stewart
BY
Barnes, Kisselle, Laughlin & Raisch
Attorneys.

Sept. 16, 1958 C. K. STEWART 2,852,373

REPRODUCING ENGINEERING DATA

Original Filed Aug. 19, 1943 8 Sheets-Sheet 6

INVENTOR.
Carl K. Stewart
BY Barnes, Kisselle, Laughlin & Raisch
Attorneys.

REPRODUCING ENGINEERING DATA

Original Filed Aug. 19, 1943 8 Sheets-Sheet 7

INVENTOR.
Carl K. Stewart
BY Barnes, Kisselle, Laughlin & Raisch
Attorneys.

Sept. 16, 1958 C. K. STEWART 2,852,373

REPRODUCING ENGINEERING DATA

Original Filed Aug. 19, 1943 8 Sheets-Sheet 8

INVENTOR.
Carl K. Stewart
BY
Barnes, Kisselle, Laughlin & Raisch
Attorneys.

United States Patent Office 2,852,373

Patented Sept. 16, 1958

2,852,373

REPRODUCING ENGINEERING DATA

Carl K. Stewart, deceased, late of Detroit, Mich., by Walter A. Kleinert, administrator, Bloomfield Township, Oakland County, Calif., assignor to Mabel Stewart Continuation of applications Serial No. 499,183, August 19, 1943, and Serial No. 5,575, January 31, 1948. This application March 12, 1956, Serial No. 574,055

9 Claims. (Cl. 96—36)

This invention has to do with reproducing engineering data, and relates particularly to the accurate and identical reproduction of loft layouts and the like in any size and without resorting to the use of the dark room.

This application is a continuation of application S. N. 5,575, filed January 31, 1948, now abandoned, which is a continuation of application S. N. 499,183, filed August 19, 1943, now abandoned.

In the commercial production of airplanes, ships, and automobiles, it is customary to make a full scale master drawing of the particular new design desired on a white coated sheet of metal. This master drawing is usually in pencil and is called a loft. Many dimensioned copies of this master drawing are usually required, and during the last two years others have developed photo-copying methods for reproducing the master drawing or loft upon sheet metal stock, and such methods have been commercially used for mass accurate fabrication of duplicate copies throughout the industry.

One such photo-copying process is disclosed in the patent to Lane No. 2,303,942. The process described in the patent to Lane has been used in many plants throughout the industry, and while it is a material improvement over old methods, it is open to several objections which include (1) the necessity of coating the master drawing metal sheet with material before being coated with the white substance on which the drawing is made by pencil, such material renders the drawing surface rough, with the result it is difficult to get pencil lines of even width; (2) the necessity of using expensive and dangerous X-ray equipment and of laminating the sensitized paper evenly and smoothly upon the negative; (3) the broadening of the lines in the duplicate print; and (4) the necessity of carrying out all processing in a dark room.

Another commercially used photo-copying process is disclosed in the patent to Hutchison No. 2,311,547. As set forth in the specification of this patent, the Hutchison photo-copying process constitutes an improvement in the photo reproducing art, particularly in that the process utilizes reflex printing to make possible faithful reproductions of the original drawing in the form of duplicate drawings or file copies. However, like the Lane process, Hutchison makes use of sensitized paper which must be applied with special care to the negative or backing element. In addition to the special care and time that must be exercised in preparing and applying the sensitized paper, the Hutchison process is open to other objections which include (1) the limiting of the size of reproductions due to the method of processing; (2) the processing must be done in a dark room; (3) the use of sensitized paper in the making of templates makes it difficult to cut and file to the lines defined by the photographic layout because of the tendency of the paper adjacent the finish line to curl or chip; and (4) the necessity of butt welding or riveting and fitting sections of sheet steel together in the event that large reproduced templates are required.

It is my belief that these many previous attempts of the last few years to develop processes for making accurate identical photographic reproductions from lofts, which might be generally called contact photo-copying methods, have wrongly followed along the lines of utilizing a paper backed sensitized surface as a surface to be placed in face contact with the original drawing; and an added feature which I believe has led contributors in this art in the wrong direction is that the emulsion used on the paper has been a quick acting relatively thick emulsion.

According to the present invention no change is made in the method of preparing the original full sized drawing or loft, usually in the form of a pencil drawing on white coated sheet metal, and instead of using expensive time consuming photo-copying contact methods utilizing sensitized paper, the basic photo-copying step of the present invention is based on the idea of a completely transparent negative wherein the thickness of the sensitized emulsion between the backing material for the negative and the pencil drawings on the loft is reduced to an absolute mimimum. This extremely thin emulsion is not highly sensitive but lends itself to working in an ordinary lighted shop and purposely requires a relatively long exposure time to produce an accurate sharp line as compared to fuzzy lines obtained with the use of highly sensitive thick emulsions. As a result of eliminating laminated sensitized paper and thick emulsions and following along the completely different line of transparent negatives with extremely thin emulsion; it is possible to reproduce any type of drawings, whether pencil or scribed; to make a reproduction drawing or a template unlimited in size; makes possible the reproducing of symmetrical or half drawings as a full drawing on a single sheet of metal; and makes possible the etched reproduction of the original drawing in part or in whole upon any thickness of template stock whereby cutting and shaping of the template stock by any kind of a tool is performed easily and cleanly without any tendency to melt or chip as when a photographic emulsion surface is used.

More specifically, a sheet of glass of a size easily handled is directly coated with an extremely thin emulsion. This emulsion is of the type that can be applied in a regular lighted shop in which the whole photo-copying process is carried out and it eliminates the expensive, tedious and careful procedure of applying sensitized paper and the use of a dark room. The emulsion is also preferably of the type that is only temporarily sensitive and one that requires a relatively long exposure time. The sensitized side of the glass is applied against the surface of the steel backed drawing or loft and the contact between the coated glass and drawing is made perfect by the use of a standard vacuum printing frame. The coated glass is exposed to a bright light for a relatively long length of time so that the lines of the drawing are very clearly and cleanly imparted to the sensitized coating on the glass.

The emulsion on the glass is preferably of the ammonium dichromate type, such as used in the photo-engraving art, with the result that the light transmitted through the glass and reflected from the white surface of the drawing will render such exposed part of the emulsion water insoluble, with the parts of the emulsion contacting the black lines of the drawing remaining water soluble. The exposed surface of the glass is then covered with a thin coating of ink and the water soluble portion of the exposed emulsion and the ink covering the same is removed, preferably by the use of a spray gun. The negative thus produced is dusted with lamp black, which adheres to the ink but not to the clear exposed portions of the glass, with the result that a perfect line negative is now produced which is identical to the original drawing in every respect.

The entire process as above described is performed in a lighted room, no special photographic papers are utilized, but instead there is produced a glass negative wherein the lines of the original drawing are faithfully reproduced by the clear glass itself and defines a smooth, clean, accurate line by the emulsion and ink backing material. This negative can be utilized to make duplicates of the original loft or to make templates, dies or other photo-mechanical duplications on steel. If desired to make a photo-mechanical reproduction of this negative on steel for template production, the sheet of steel to form a finished template is sensitized by spraying of a special emulsion thereon. The negative is placed in face contact, under vacuum, with the sensitized steel surface. The sensitized steel surface is exposed to light for a relatively long time, which light passes through the clear lines of the glass negative. The exposed sheet of metal is now sprayed with etching ink, such as engravers' etching ink, dissolved in turpentine. Subjecting the ink coated surface to water will remove the soluble flat spaces between the lines, leaving an ink print in exact duplication to the transparencies of the negative. This inked print on the steel is sprayed with a special shellacked coating mixed with dye. Scrubbing of this colored shellacked surface with a special solvent removes the underneath inked lines to expose the bare metal of the steel template or the like, but leaving the colored shellac as the gackground in the spaces between the lines.

The exposed bare metal lines which now form an exact duplicate of the original loft drawing are subjected to an etching solution which etches the bare metal to a depth of two to three thousandths. The colored background and the etched lines present an excellent guide for cutting and filing the steel stock to produce a template or the like. The etched lines in the final product, by the very nature of their reproduction, first upon glass to form a transparent negative, and then by contact with the sensitized steel, keeping in mind the thiness of the emulsion on the glass negative and the sharpness of the edge of the emulsion defining the tpansparent lines, will only vary as room temperatures will alter glass and steel from their original layout. Photo-copying methods of the past have recommended a maximum tolerance for template production of one thousandths of an inch per foot from the original; the present method presents a tolerance of less than half such maximum tolerance as heretofore recognized.

A further feature of the present invention made possible by the use of transparent glass negatives is the combining of two or more negatives in the duplicating of a large loft drawing or in photo-copying the original large drawing on a single piece of metal in forming a template or the like. Heretofore it has been necessary to mill and butt weld the steel prints together but with the present method it is only necessary to mark the original loft with targets or register marks, which marks are, of course, transferred as transparent lines to successive glass negatives of a size which can be easily handled. In transferring the images on the series of two or more negatives to a large sensitized piece of steel, it is only necessary to line up the targets on each successive glass negative with the targets transferred to the steel by the previous adjacent glass negative. It will thus be seen that original steel loft drawings which are ofttimes twenty feet and over in length, can be accurately and exactly duplicated upon a single one piece sheet of template stock, the lines of the original loft being etched on the large single piece template stock.

A further feature of the invention, and also made possible through the use of transparent glass negatives, is the photo-copying and completion of symmetrical drawings; that is, where the article or object is symmetrical on both sides of a common center line, in which case it is only necessary for the draftsman to draw half of the article on the loft or similarly backed drawing. This symmetrical half drawing is reproduced on the glass negative, as above described, and then a glass positive is made from the glass negative. The image on the glass negative may then be transferred to the sensitized sheet of steel, as previously described, to produce a duplication of the original loft drawing and then the glass positive may be lined up with the lines already on the steel and the image thereon transferred to the other half of the sensitized steel to make a complete drawing.

A still further feature of the invention is the ability to temporarily block out any lines in making a reproduction drawing or a template and allowing subsequent establishing of all the original lines on the negative. This is useful in making development drawings and in making templates of certain parts of a main drawing. It will be seen that the photo-copying of the original loft drawing on metal stock can be made on one-quarter inch or one inch steel, as well as on thin sheet metal, which makes the process adaptable to jigs and fixtures as well as the fabrication of templates.

A further important feature of the present invention is that all tool holes established in the original loft drawing will remain constant throughout all parts, the final etched holes making center punching very accurate, and eliminating "walking" of the punch which occurs when paper is the sensitized surface on which is indicated the centers of the holes to be drilled.

Other features have to do with detailed steps of the method, structural details and formulae, all of which will be more fully and specifically set forth in the following specification and claims.

Figures 6, 7, 8, 9, 9A:
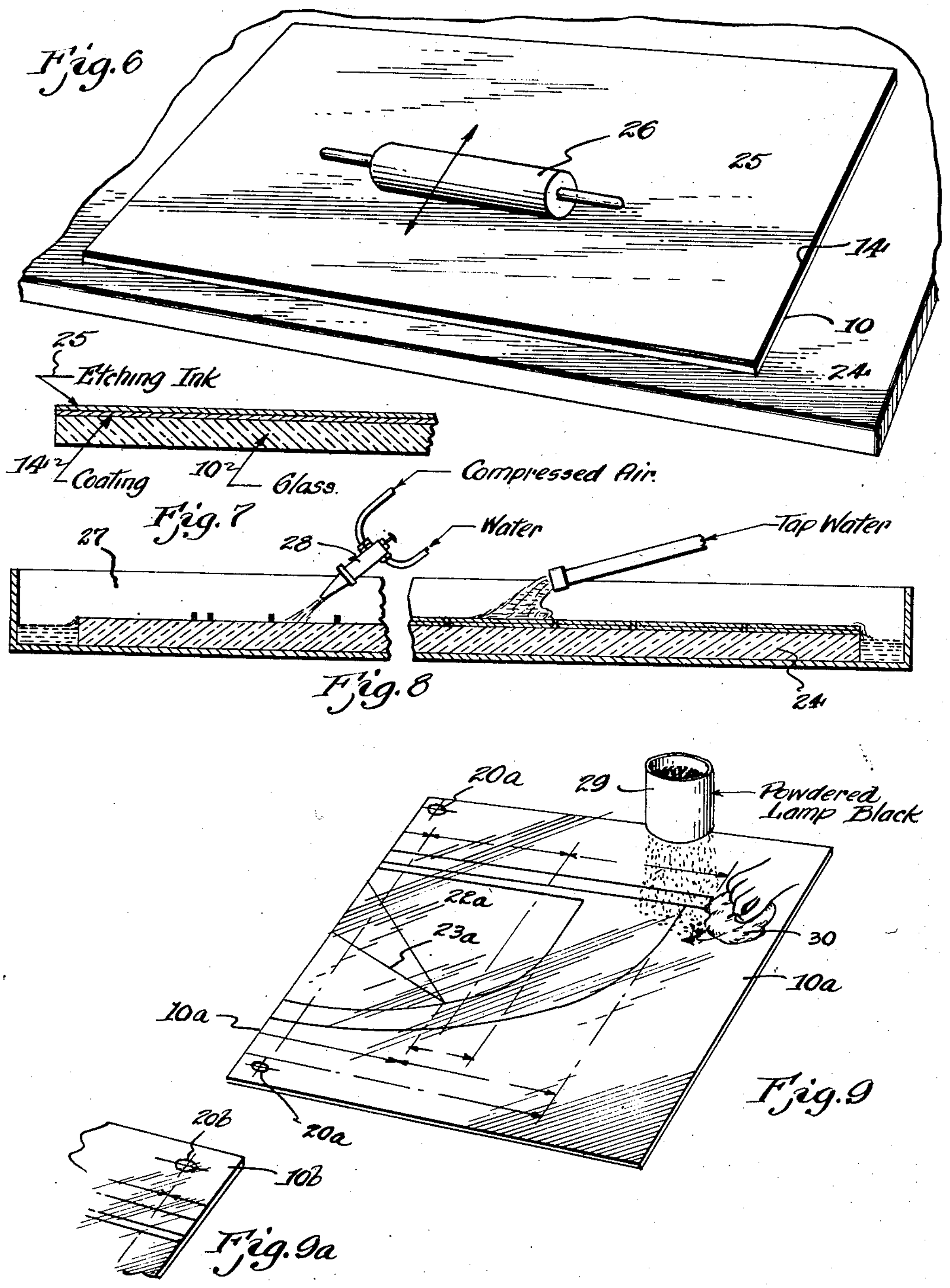
Fig. 6 illustrates the rolling up of the ink on the exposed surface of the glass.
Fig. 7 is a fragmentary sectional view illustrating the layers of emulsion and ink on top of the glass.
Fig. 8 illustrates a method of removing the soluble portion of the emulsion and the ink coating therefor to produce a negative the image of which is defined by the clear glass surfaces.
Fig. 9 illustrates a step of adding powdered lamp black to the ink surface to build up the sharpness of the lines.

Fig. 9*a* is a fragmentary perspective view of a step or extension negative used to cooperate with the negative such as shown in Fig. 9 to reproduce one piece drawings larger than the negatives themselves.

Figures 10, 11, 12, 13:
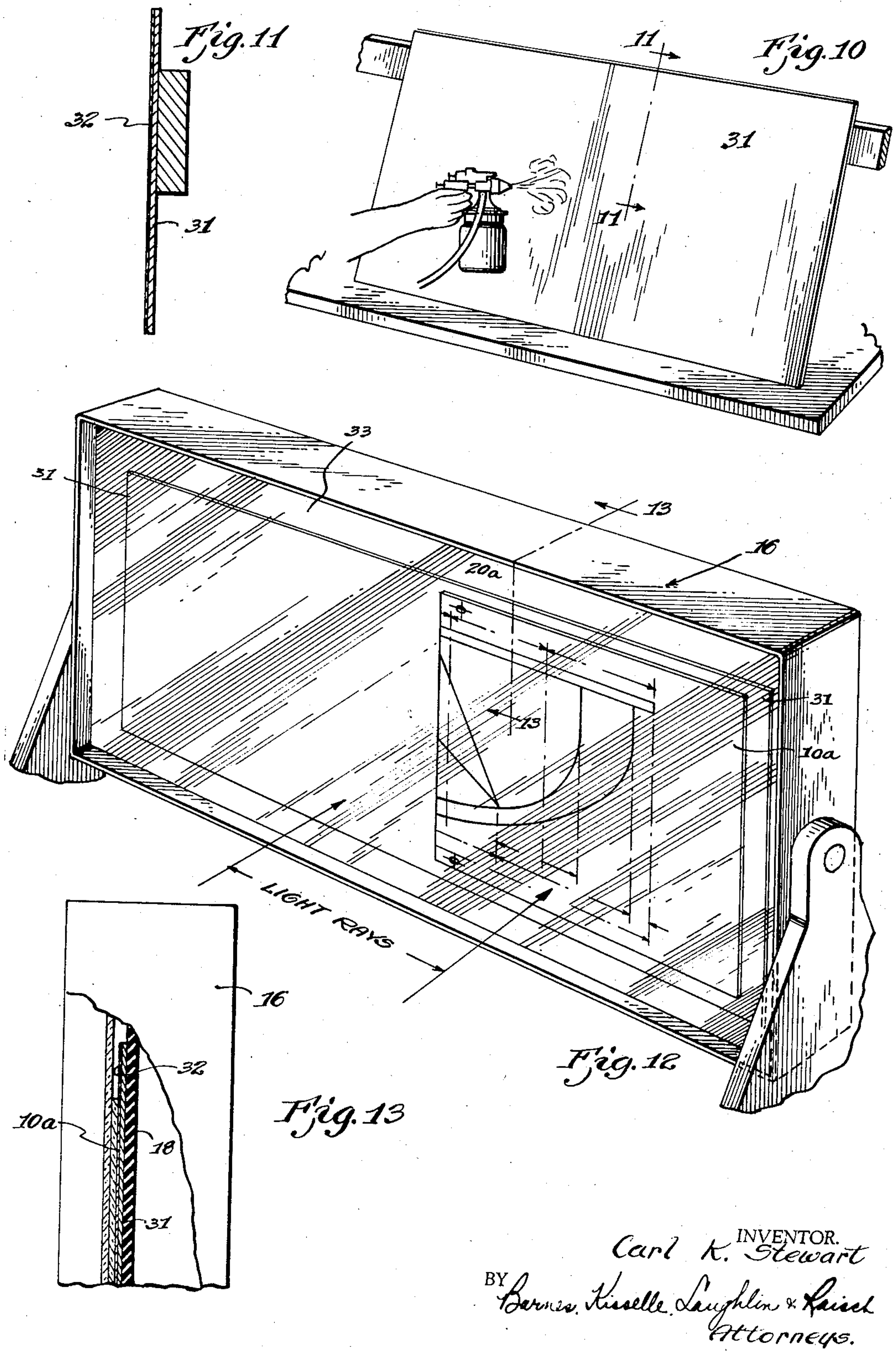

Fig. 10 illustrates the step of spraying sensitized emulsion onto a steel plate in preparation for making a duplicate drawing or template.

Fig. 11 is a sectional view taken on line 11—11 of Fig. 10, illustrating the building up of sensitized emulsion on the steel plate.

Fig. 12 is a perspective view, largely diagrammatic, showing the glass negative being held by a vacuum against one end of the steel plate.

Fig. 13 is a fragmentary sectional view taken on line 13—13 of Fig. 12 and showing the vacuum face contact between the finished negative and sensitized sheet of steel.

Figures 14, 15:
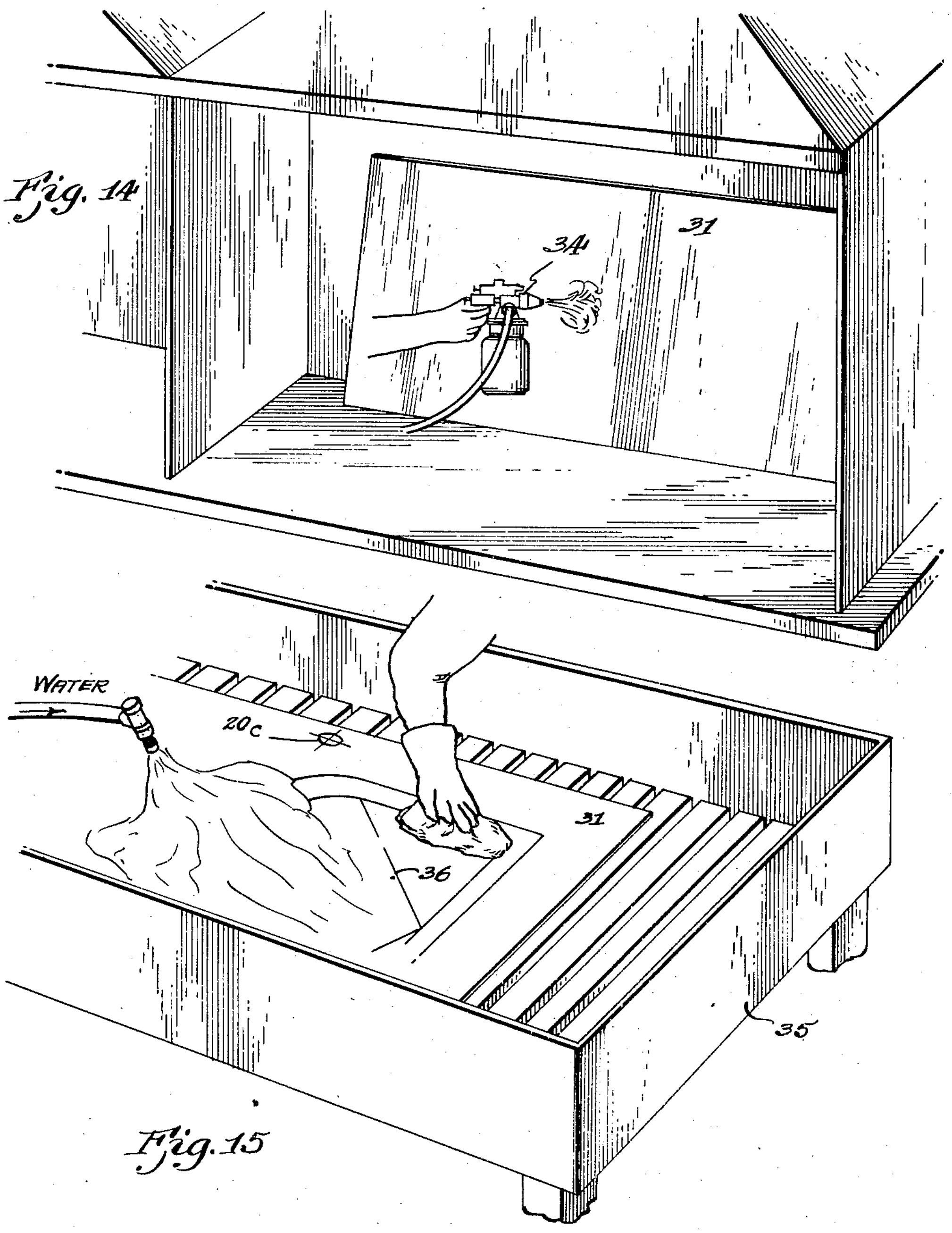

Fig. 14 illustrates a method of spray coating the exposed portion of the sensitized sheet of steel with a backing material such as ink.

Fig. 15 is a perspective view of a developing tank for removing the unexposed soluble portions of the emulsion from the sensitized steel sheet to produce an ink line duplicate of a portion of the original loft drawing.

Figures 16, 17, 18, 19:
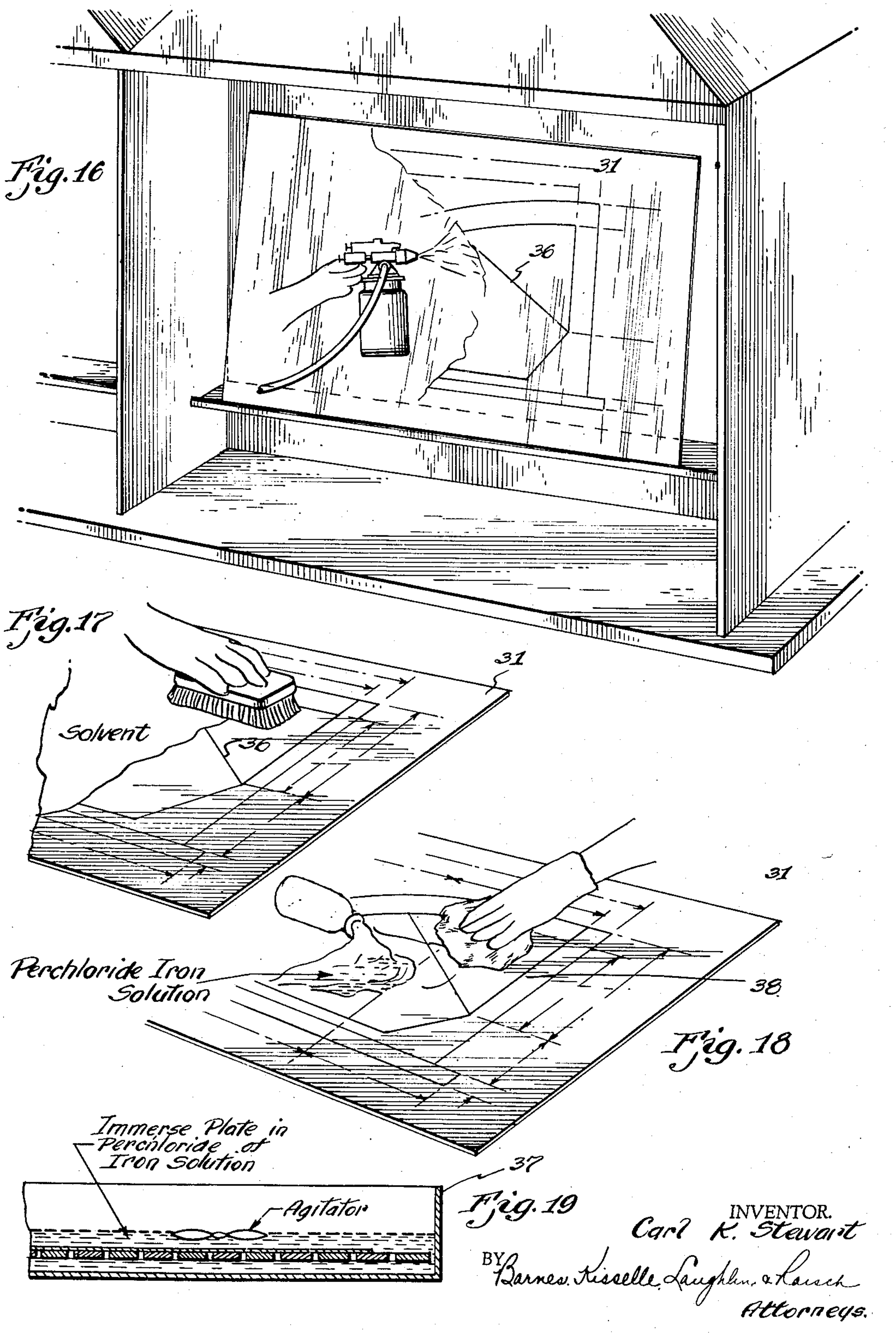

Fig. 16 illustrates the step of spraying the completed ink line print on the steel sheet with colored shellac.

Fig. 17 illustrates the step of removing the ink lines beneath the shellac by a solvent which removes only the ink line formation leaving the metal exposed.

Fig. 18 illustrates the step of starting the etching of the exposed steel lines to form a layout of etched lines in place of ink lines.

Fig. 19 illustrates the step of completing the etching by immersing the plate in the etching solution.

Figure 20:
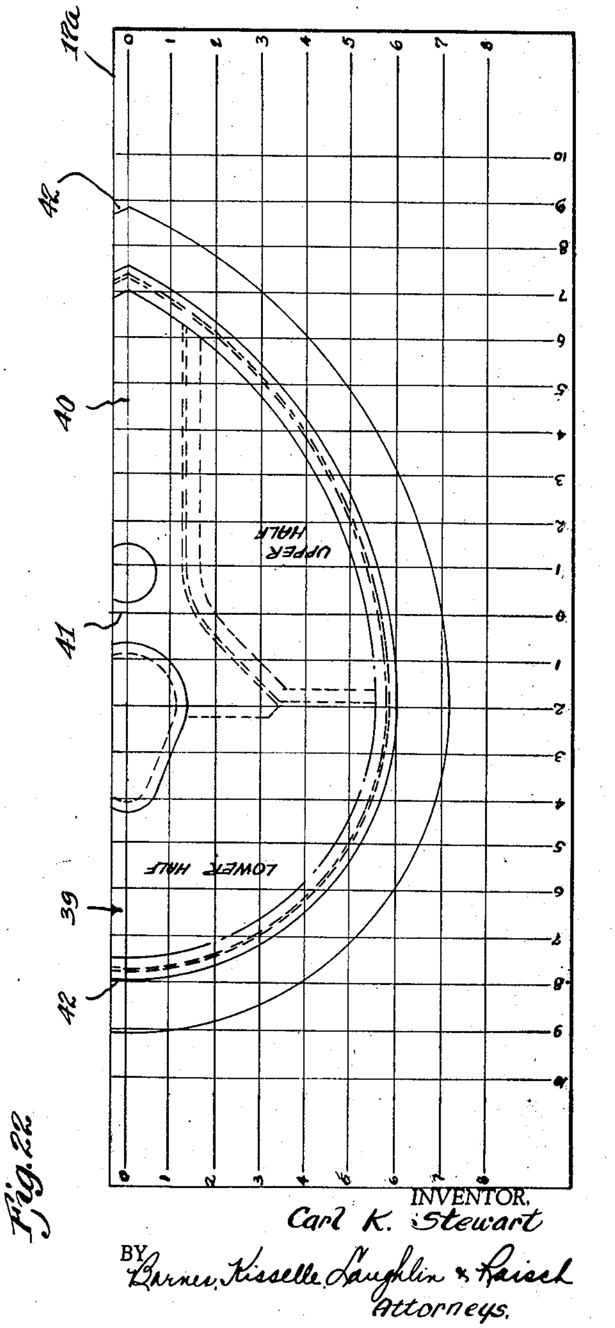

Fig. 20 illustrates a loft symmetrical drawing wherein only half of the completed layout is finished on the face of the loft.

Figure 21:
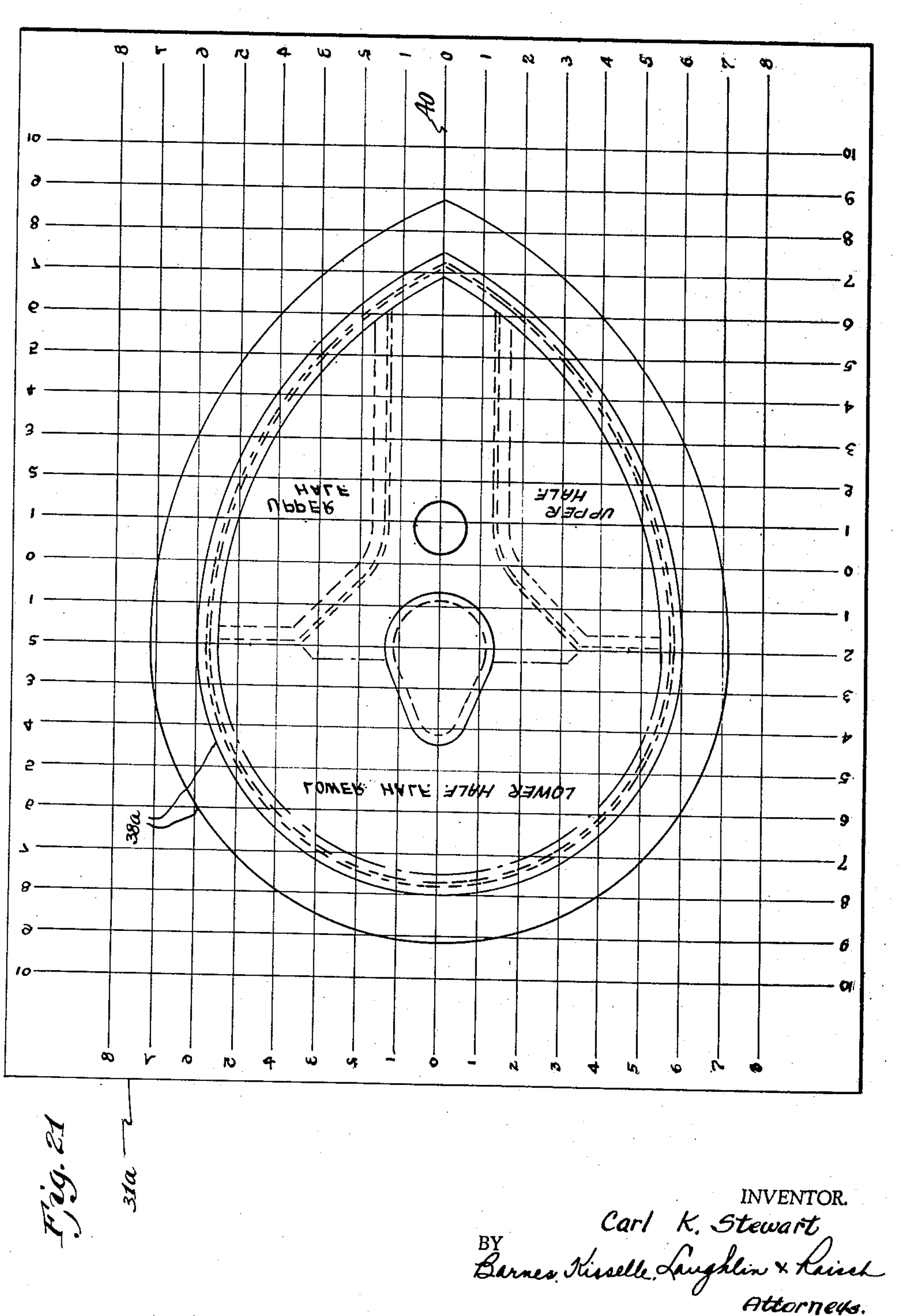

Fig. 21 illustrates the transfer of the drawing through the medium of transparent glass negatives and positives in the form of a completed etched layout on a steel surface.

Figure 22:
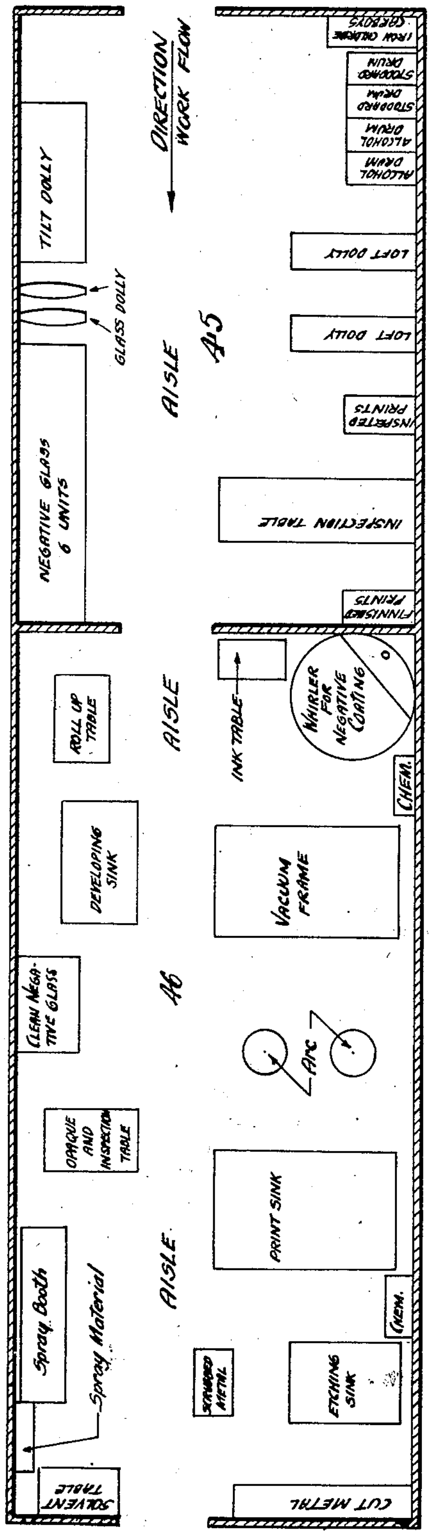

Fig. 22 illustrates a complete plant layout showing a compact arrangement in various units for carrying out my photo-copying process, all steps being carried out in normal light.

It must be kept in mind that the predominant factor throughout the entire process is accuracy, this applies to the small detail sub-steps as well as to the main steps of the process. Accordingly, the figures of the drawing are arranged rather closely in accordance with the preferred process and it is believed a better understanding of the process will be had by a detailed disclosure of all the steps, even though many of them may be familiar to those skilled in the art.

While the present process may be utilized to reproduce actual finished templates and similar articles, it may best be described as more particularly adapted for use in photomechanically reproducing full sized "lofts," which in the industry consists of a lacquered metal sheet on which the engineered drawing is originally produced, full scale, in pencil. The original loft as received in the workroom preparatory to making the reproductions must first be inspected to be sure that the original drawing is as clean as possible and that all lines stand out with as much contrast as possible. It will be understood that this original drawing may be a large one, say five by twenty feet, or may be a series of very small drawings. It has been found practical to use one quarter inch plate glass approximately three by five feet. Such size is the maximum which is easy to handle by the average man, in carrying out all the processing steps. This glass is thoroughly scrubbed with pumice and thoroughly rinsed with clean water and hand brushed while rinsing. The glass must be kept wet. The sheet of plate glass, which is designated 10 in Fig. 1, while still wet is locked in place in a standard whirler 11, such whirler having a motor mechanism 12 and the usual automatic controls for speed, temperature, and duration of whirling. When the plate glass 10 is first locked in place, clear water is flowed thereover and an even distribution over the entire surface is obtained by a brief whirling. A predetermined amount of chromium salt sensitizer 13 is next flowed onto the glass and the glass is whirled until dry at a predetermined speed and heat, in accordance with the type of whirler used, keeping in mind that the result must be a uniform thin emulsion coating.

An effective emulsion that may be used is set forth by the following formula:

20 oz. fresh egg albumen
200 grains ammonia dichromate
40 drops ammonium hydroxide
1 gallon distilled water Beat egg albumen (whites) well with power beater—use some of distilled water to dissolve dichromate— mix water, albumen and dichromate solution thoroughly, add ammonium hydroxide. Filter carefully through cotton at least twice, let stand three days before using and filter again just prior to use. Keep clean and free of dirt. Albusol solution can be substituted—use approximately same quantity as albumen but adjust according to negative problem. Albusol sensitizer solution can be used immediately after filtering through filter paper. Keep stored in dark bottles in a cool place. Solution should be good for thirty days.

Figures 1, 2, 3:
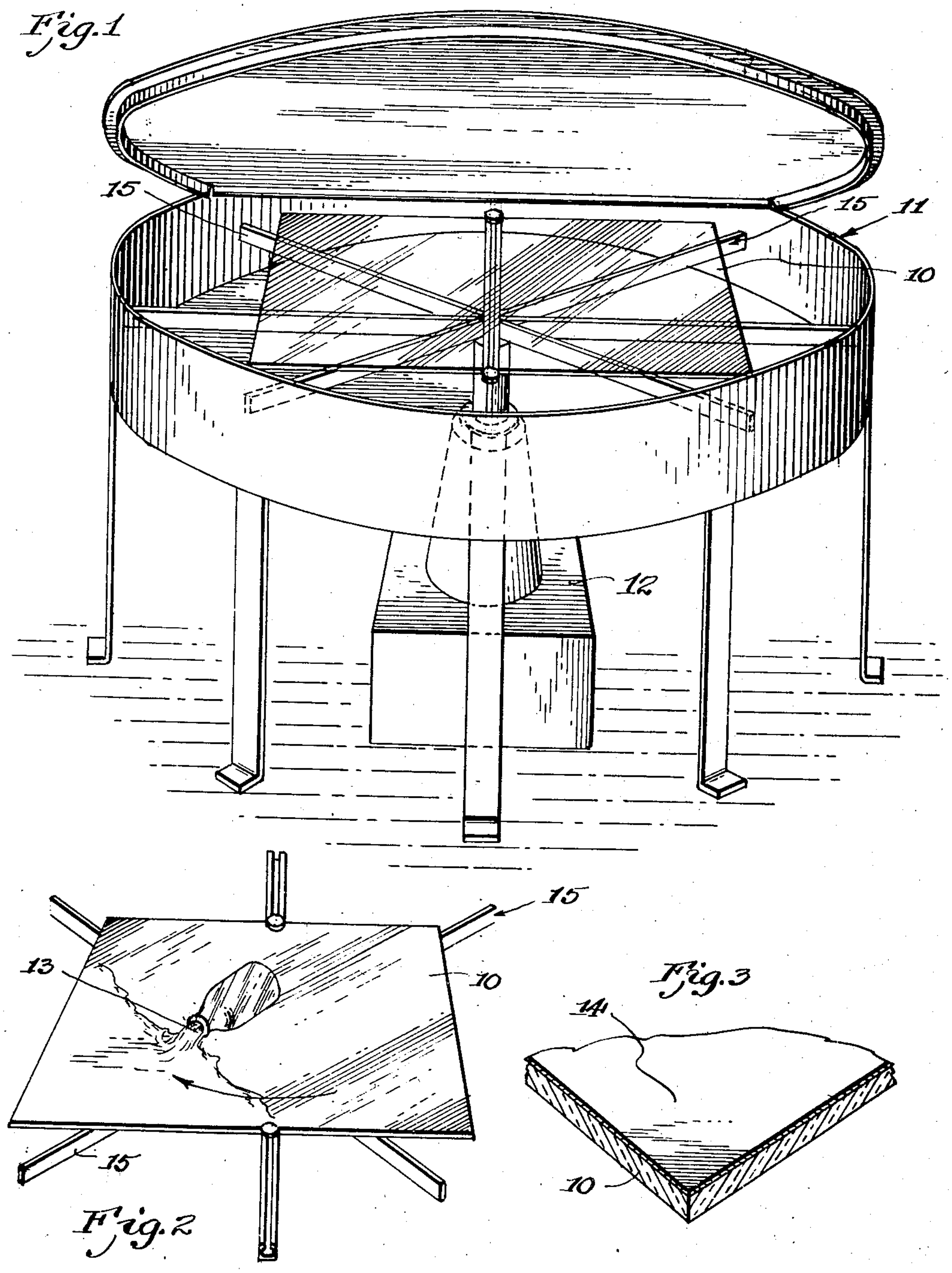
Fig. 1 is a perspective view of a mortar, of more or less standard type, for evenly flowing the sensitizer over the surface of the glass plate.
Fig. 2 illustrates the step of flowing the sensitizer onto the surface of the glass preparatory to whirling.
Fig. 3 is an enlarged view illustrating the even coating of sensitizer on one surface of the glass plate.

It is desirable to have a finished dry emulsion 14 on the plate 10 of a thickness of less than .0005 although I have found that fair results may be obtained with a thickness of emulsion up to one thousandth of an inch. The obtaining of this even thin emulsion is the result of experience and it must be remembered that the R. P. M. of the whirling fixture 15 controls the thickness of the emulsion coating; that the thickness of the emulsion affects the exposure time as will be subsequently described, and that the temperature and humidity of the room affect the sensitivity of the emulsion. The entire process to be presently described is to be carried out in a normally lighted room and the coated plate 10, such as shown in Fig. 3, should be used within two hours after the coating step. It should be noted here that the emulsion set forth in the above formula is a very inexpensive one, and of equal importance is the fact that the plate may be sensitized as needed so that the whirler becomes a part of a production line, all in the same room or a series of rooms, so that no large stores of sensitized plates need be maintained in the dark room.

Figures 4, 5:
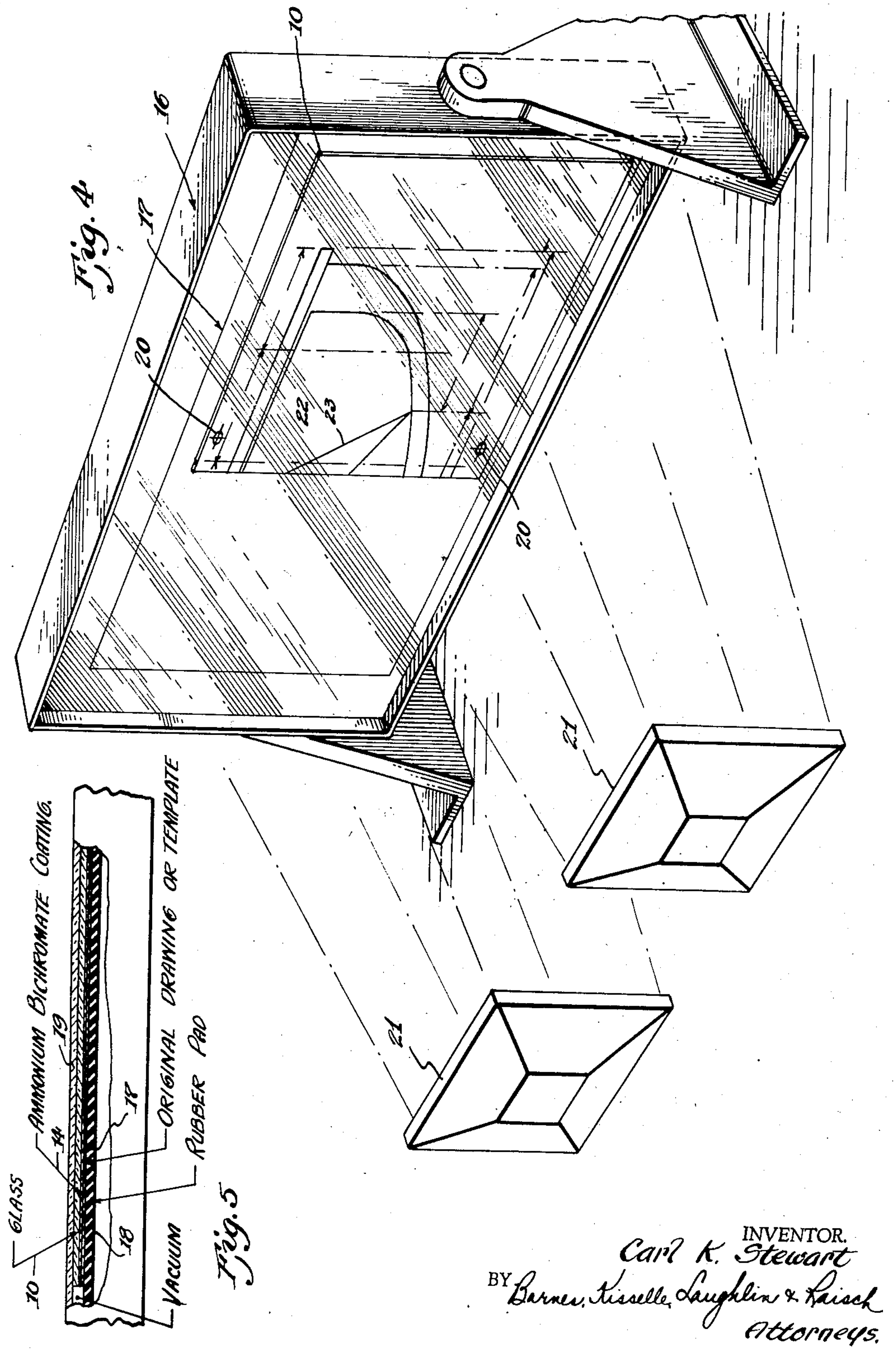
Fig. 4 is a perspective view, largely diagrammatic, showing the sensitized surface of the glass being held in contact with the surface of the loft drawing in a vacuum frame, the sensitized surface being subjected to a source of bright light.
Fig. 5 is a sectional view taken through the loft and plate held in position in the vacuum frame and showing the relationship between the various surfaces so held.

A vacuum printing frame is diagrammatically illustrated in Fig. 4 and generally designated by the numeral 16. This frame is shown in position vertically in Fig. 4, but in use it is first positioned horizontally as best shown in the enlarged section of Fig. 5, and the original steel backed drawing or loft 17 is placed, back down, upon the top of a rubber pad 18, which pad forms a standard part of vacuum printing frames. Next the glass plate, carefully handled to prevent accumulation of dirt, is placed with the emulsion side down against the drawing on the face of the loft 17. The moisture is cleaned away from the back of the glass, the outer glass pane 19 of the printing frame is lowered into place, the frame locked and a vacuum of fifteen to twenty inches is applied. In the showing in Fig. 4, the loft 17 is approximately twice the size of the emulsion coated glass 10 which is to become the negative. In this case the glass 10 is placed at one end of the loft 17 and suitable targets or register marks 20 are placed on the face of the loft whereby these register marks 20 are located close to the edge of the glass plate 10 when the latter is lowered in place, as shown in Fig. 4.

The frame 16 is then moved to vertical position, as shown in Fig. 4, and the glass plate 10 is exposed for approximately thirty seconds to four arc lights such as diagrammatically illustrated at 21, which are preferably set approximately fifteen feet from the frame. This exposure time, while variable and obtainable with experience, is important and critical because a variation of five seconds may make a difference between good or bad results. Another important point here is that the exposure is for a relatively long time, particularly as compared to exposures made in prior photo-copying methods.

As familiar to those skilled in the photo-engraving art, the light rays from the arc lamps pass through the transparent glass plate 10 and are reflected from the white portions of the original drawing 17, such as 22, and are absorbed by the black portion or the lines 23 of the drawing. The portions of the sensitized emulsion opposite the white portions or background in the original drawing are thus rendered insoluble by the reflected light, the other portions adjacent the black lines of the drawing remaining soluble. It will be obvious that the very nature of the emulsion or sensitized film 14, requiring a relatively long exposure time, makes for an extreme cleanness of line as contrasted with the fuzzy line usually obtained with thick highly sensitive emulsions which can only be exposed a very short time.

The exposed sheet of glass 10 is then removed from the frame 16 and placed on a roll up table 24 where the surface of the emulsion receives a relatively thin coating of a building up material such as etching ink. Good results may be obtained with etching ink having a proportion of 50% Frederiksen's etching ink and 50% Perfection etching ink. This etching ink 25 is rolled onto the negative evenly, such as by use of a roller 26, until the relatively think ink surface presents a color which appears to be about half way between black and white; it should take approximately fifteen minutes to ink up a three by five foot glass plate evenly. The purpose of this ink is to give body to the emulsion, and it will be obvious that materials other than ink may be used such as various types of synthetic resins.

The glass plate 10 with its backing up material of etching ink is next placed in a developing sink 27, as best shown in Fig. 8, and subjected to flowing water, the plate is thoroughly soaked so that no dry spots remain and is so allowed to soak for approximately eight minutes so as to loosen the soluble emulsion under the ink. It will be remembered that only the portions of the emulsion which were originally in contact with the lines of the drawing are soluble in water. The soluble portions of the emulsion and the ink covering therefor may be removed by a gently applied cotton swab, but the removal of the soluble emulsion is greatly hastened by the use of a spray gun 28 utilizing compressed air and water. The pressure in the gun is preferably from twenty five to ninety pounds according to negative conditions and the gun should be held a distance of about ten inches from the surface of the emulsion. The tap water used in the gun and for keeping the plates soaked should be maintained at approximately 68° F. The air pressure and water will remove all the soluble emulsion and backing of ink and the line between the insoluble emulsion and the soluble emulsion will be well defined because of the greater length of time the emulsion is exposed. In other words, the line between solubility and insolubility is well defined. The result is a negative **10*a* identical in all respects with the original loft drawing with the exception that the lines 23*a* are now white as formed by the clear glass of the plate and the portions 22*a*** are black. By following the above described process there is and can be no appreciable difference in the width of the line defined by the clear glass of the negative and the width of the original black line on the loft.

A small amount of powdered lamp black 29 is next applied to the negative surface using a sifter and a cotton swab 30. The excess lamp black is washed off with water and a cotton swab, the oil surface of the ink holding the lamp black in place. The negative is then dried with air so the lamp black intensifies the smoothness of the lines. The negative is next placed in a spray booth and sprayed with a thin coating of protective lacquer, which allows for considerable handling and use of the negative without damage to the transparent lines thereon.

The negative now produced can be utilized to reproduce the original loft drawing on a duplicate loft drawing or can be used in the production of templates, jigs, fixtures and the like. In any case it is often desirable to reproduce only a portion of this original negative and this may be done at this point in the process by opaquing to remove any lines or holes desired. Any standard soluble opaquing material may be used, the protective lacquer coating permitting the washing off of the opaque material as desired to restore the negative to its original condition.

The process just described has been made with reference to a single ngeative **10*a*. The loft 17 as shown in Fig. 4, contains some lines not covered by the sensitized glass plate 10; accordingly, a second glass plate, preferably of the same size, three by five feet, is now prepared in the same manner described in connection with the plate 10. It is important to note here that the first negative 10*a*, as shown in Fig. 9, carries the targets or register marks 20*a* which correspond with the same marks 20 on the original loft drawing; see Fig. 4. The second sensitized glass plate is now placed so that its right hand edge will overlap the targets 20 on the loft and, of course, the remaining portion of the glass plate will cover the remaining portion of the drawing at the left hand end of the loft 20, as viewed in Fig. 4. This second glass plate will be exposed and processed in the same manner as the glass plate 10 to produce a final negative, fragmentarily shown as at 10*b*** in Fig. 9*a*, similar to the one shown in Fig. 9 with the exception that the targets or identification marks **20*b* will be located at the right hand edge of the negative 10*b* instead of at the left hand edge of the negative 10*a*** as shown in Fig. 9.

The process will now be described in connection with the production of a template, and in this case the template stock which may be the sheet of metal 31, as shown in Fig. 10, which has been cut to necessary size, is rinsed with a solvent such as Stoddard's solvent and is scrubbed with pumice and water until the sheet is polished and free of grease. It is then dried with a squeegee and air. The back of the steel sheet 31 is next sprayed with shellac as a rust preventative and the front polished face of the sheet 31, as shown in Fig. 10, is then sprayed with an emulsion of the same general type as previously described. A good sensitizer for steel is made according to the following formula:

16 oz. Albusol
8 oz. photo engraver's glue
200 grains ammonia dichromate
40 drops ammonium hydroxide
1 gallon distilled water Dissolve dichromate in water, add glue and when thoroughly dissolved add Albusol, mix thoroughly, add ammonium hydroxide. This can be used immediately after filtering through filter paper. Keep clean and free from dirt.

The above emulsion is so proportioned as to make it readily adaptable for use with a spray gun.

This piece of steel, which may be as long as twenty five feet or even more, is next sprayed with this sensitizer solution, being careful to apply the first coating with a very thin material spray which is allowed to quickly dry into a first coating. The material nozzle is then opened and six coats are preferably built up, one after the other, without any appreciable drying interval therebetween. During this spraying operation the sheet of metal 31 should be maintained at a temperature approximately 70°. The result is a sensitized emulsion 22, preferably less than .0005 in thickness, one which is applied in normal light and which should be exposed for approximately two hours.

The sensitized sheet steel 31 is next placed in the same vacuum printing frame with the back surface of the steel contacting the rubber pad 18. The negative **10*a* is next placed in face contact with the sensitized surface of the steel, the area 33 of the sensitized sheet steel 31 being first blocked out with black paper. The frame is then locked, vacuum applied and tilted to exposure position as shown in Fig. 12. A suggested procedure is an exposure of approximately two minutes to four arc lights set at approximately four feet from the frame. The relatively long exposure produces similar results as heretofore explained, in that the light will pass through the transparent lines on the negative 10*a*** to produce well defined exposure areas on the sensitized steel plate.

The partially exposed steel sheet 31 is removed from the frame and sprayed with standard liquid litho-developing ink as shown at 34 at Fig. 14, using a fine spray and coating to a medium gray less than black, with an air gun pressure of approximately eighty pounds and the nozzle held approximately twelve inches from the sheet. It is important that the sensitized metal remain at room temperature, approximately 70° F. If more than one negative is to be used in transferring the original loft layout to the sheet of steel 31, then only that portion which has been exposed, as shown in Fig. 12, is sprayed with ink. The dry inked surface is next developed by placing the sheet of steel 31 in a tank 35, as shown in Fig. 15, and using a spray jet from a water tap or a spray gun, the portions of the emulsion covered up by the black part of the negative during the exposure, being soluble, will be removed. The exposed portion of the sheet 31 should then be cleaned up completely by use of a swab of cotton. The ink line image 36 formed by the insoluble emulsion and the top coating of ink will remain quite sturdy and if handled under cool water can be scrubbed quite vigorously even with a hand scrub brush without harming the lines.

At this point, if it is desired to remove any lines which have not previously been masked out in the negative, it can be accomplished by utilizing charcoal to remove any line or lines. The print is then dry finished with air and if it is desired to keep the other portion of the print on to the steel sheet 31, the sheet 31 is placed back in the vacuum printing frame and the second negative 10*b* is placed on top of the remaining sensitized portion of the sheet 31, being sure that the targets 20*b* on the negative 10*b* line up with the targets 20*c* produced as ink lines on the sheet 31 by the targets 20*a* of the negative 10*a*. With these targets properly lined up, the printing frame is then closed and placed under vacuum and the second negative exposed to light, the sheet 31 removed from the frame and processed in the same manner as just described in connection with the processing of the first half of the sensitized sheet 31. It will now be seen that there is produced upon the sheet 31 a positive ink line image identical in all respects with the drawing on the original loft, which can be used as a reproduction or reference drawing. It will also be obvious that regardless of the size of the sheet 31 and the size of the original loft, as many negatives may be used as desired, containing corresponding targets or register marks so as to accurately transfer the entire loft drawing as a final print on one piece of metal.

It will be understood that in repeat printing, where a plurality of negatives are used, that it may sometimes be desirable to sensitize only a portion of the metal sheet 31 at a time; in other words, a three by five foot area could be sensitized, exposed and processed and then an adjacent three by five foot area sensitized, exposed and processed, etc.

The inked print lay out, whether transferred to the sheet 31 by a single or multiple set of negatives, is next sprayed, as shown in Fig. 16 with a selected color of shellac. I prefer to use a violet or black violet color as set forth in the following formula:

1¼ oz. spirit methyl violet extra concentrated
36 oz. white (or orange) shellac 4 lbs. cut
Alcohol to make one gallon or 1¼ oz. spirit black methyl violet extra concentrated
32 oz. white (or orange) shellac 4 lbs. cut
Alcohol to make one gallon Dissolve dye alcohol using power mixer to thoroughly dissolve. Add liquid shellac and balance of alcohol—mix thoroughly with power mixer. Filter through fine cheesecloth and store for use. Be sure that mixture is thoroughly in solution before using, to prevent clogging spray gun and to work well as resist to etch.

The first coat is applied as a fine spray and allowed to dry in about three minutes, the metal sheet, as before, remaining at room temperature. Next the material jet is opened wider for applying a number of coats so as to obtain a deep translucent coating, normally about three coats is sufficient; it is important to note here that the metal must be kept clean otherwise the shellac will not bond and will come off in the etching step; again, if an incorrect dye (a water soluble dye) has been used, or not properly mixed in the shellac, the coating will not stand up in the etching step. After the final shellac coating is dry the plate 31 is laid on a table, as illustrated in Fig. 17, and a suitable solvent such as Stoddard's solvent is applied to the shellacked surface and allowed to soak in for a few minutes. The purpose of this solvent is to remove the ink lines and the shellac covering said lines. A hand scrubbing brush may be used with a firm rotating motion so as to scrub out all the ink line formation 36. The plate is next cleaned up with a felt block so that all the lines 36 in the drawing layout are now formed by exposed surfaces of the steel plate 31; the shellac background, the portion in between the lines 36, will remain intact.

The plate 31 is next placed in an etching sink 37 and, as illustrated in Fig. 18, the surface of the plate is first swabbed with a perchloride of iron solution to start the etching process, the solution being swabbed into the bare lines 38 presented by the surface of the metal sheet 31. The sink 31 is then filled with a perchloride of iron solution or the plate may be immersed in another tank containing the solution, the plate being repeatedly immersed for approximately six minutes so as to produce an etched line of a depth of about two to three thousandths; at this depth the etch can be accurately determined with a little skill. A suitable perchloride of iron solution is made up of one third tap water and two thirds of perchloride of iron with a specific gravity of 38° to 42°. Suitable etching acids may, of course, be used.

In immersing the plate in the perchloride of iron solution the condition of the shellac background should be carefully watched, normally this shellac background surface will stand up for about twelve minutes in the perchloride of iron solution. As an alternative method, specially useful for large plates which will not go in the tank, the perchloride of iron solution may be applied with a cotton swab to the surface, as indicated in Fig. 18. After etch to the proper depth, plate 31 is throughly cleaned on both sides with water and dried with air, and then placed in a spray booth and sprayed with clear shellac to prevent rust. It will be obvious that the etched lines make an excellent guide for shearing or band-saw cutting and filing. Obviously there is no shipping or curling up as has been the case where sensitized paper has been used. Furthermore, the etched shellacked surface safeguards the lines in case of excessive handling before fabricating the template.

My process is particularly adaptable to the photocopying of a single sheet of symmetrical drawings. Such a drawing 39 as applied to a loft is shown in Fig. 20. The drawing being symmetrical, just one half of the same is drawn upon one side of a main center line 40; the transverse center line 41 and other lines 42 being continued slightly past the center line 40; the transverse center line 41 and the other lines 42 being continued slightly past the center line 40 for a purpose to be presently described. The steel loft containing the symmetrical drawing, as shown in Fig. 20, is designated 17*a* and this may be in two parts, one containing the upper half of the drawing and the other the lower half, or both the upper and lower halves may be on one steel sheet as shown. In photographically transferring the layout as shown in Fig. 20 to make a full size complete template, a transparent negative is first made of the drawing in Fig. 20 in accordance with the process previously described. From this transparent negative is then made a transparent positive, the background in such case being clear and the drawing being contained on the second sheet of glass as ink lines.

The entire drawing made from the symmetrical half of Fig. 20 is shown transferred to a steel plate 31 as etched lines 38*a*. This is accomplished by first sensitizing the lower half of the sheet of steel 31*a* by spraying the ammonium dichromate emulsion as heretofore explained and then taking the negative made from the loft 17*a*, placing the same in face contact with the lower part of the sensitized sheet of steel 31*a*. Exposing and processing the sensitized lower half of the sheet of steel 31*a* in a manner heretofore described will produce an ink line layout on the lower half of the sheet of steel 31*a* similar to that shown in the loft 17*a* in Fig. 20, the sensitized portion of the sheet of steel 31 extending slightly past the center line 40 so that the ink lines will extend past the center line as shown at 41 and 42 in Fig. 20. If desired the bottom half or inked half of the sheet 31 may now be sprayed with a colored shellac, as previously described, and the ink lines and shellac covering the same removed by the use of a solvent so as to leave the clear exposed steel lines on the lower half of the sheet 31*a*. The top half of the sheet 31*a*, as shown in Fig. 21, may now be sprayed and sensitized with a slightly different emulsion than that used in the bottom half because a positive transparent glass plate is used instead of the negative in connection with the lower half. A desirable formula for this emulsion is as follows:

16 oz. shellac
14 oz. ammonium hydroxide
2 oz. ammonium bichromate
½ oz. ammonium carbonate
128 oz. of water The exposure of the above emulsion is approximately the same as the other steel sensitizer but instead of processing with ink and a solvent, the exposed surface of the plate is immersed in a methyl alcohol bath containing methyl violet dye.

In this latter step of using a positive instead of a negative, the background is clear and the lines are solid, with the result that the portion of the plate 31*a* contacted by the lines of the positive remain soluble. Ascordingly, the alcohol will remove the soluble lines from the emulsion to expose the clear steel plate and the methyl violet dye will dye the background so that the upper half of the plate will then be similar to the lower half, with a possible slight difference in the color of the background. The entire plate can then be etched in a manner heretofore described. It will be noted that the difference in using a positive transparent plate instead of a negative is that a step is saved in that the sensitizer is mixed in with the shellac and dye, whereas when a regular negative is used, it is necessary to ink up the exposed sensitized surface and then spray with shellac and dye.

Where scribed drawings are to be reproduced the scribe lines are, of source, white and the background black so that a positive is produced and the reproduction of such a drawing on template stock preparatory to etching is made in accordance with the process just described in connection with the top half of plate 31*a*, Fig. 21.

Fig. 22 illustrates the compactness of a shop layout utilizing my method for reproducing engineering data. The room 45 is a storage and inspection room but as far as light is concerned may be combined with the main workroom 46. Different arrangement can, of course, be made but as shown in Fig. 22 all the units are formed in a regular production line, all are convenient and all are operated under normal shop lighting conditions. The enormous time saved in eliminating dark rooms, dark room processing and paper laminating is obvious. Compared with at least three commercial photo-copying methods recently in use, my simple, direct thin emulsion, transparent negative, method has not only made it possible to fabricate templates, dies and fixtures in one piece and with much greater accuracy, but makes possible an enormous saving in cost of materials used and man hours required in carrying out the entire process from loft to finished template. Average cost figures taken from the commercial production of standard templates by the method herein described show a production rate of three square feet per man hour, from the original loft to the finished template.

I claim:

1. A process for photo-mechanically reproducing engineering drawings from lofts, master drawings and the like, which comprises coating a surface of a sheet of glass with a very thin emulsion of the ammonium dichromate type which is is temporarily photo-sensitive, placing the emulsion side of said sheet of glass in face contact with the drawing to be reproduced, exposing the emulsion while still sensitive to light transmitted through the glass and reflected from the drawing for a relatively long period of time, whereby the emulsion contacting the lines of the drawing is rendered water soluble and the remaining emulsion water insoluble, rolling up the exposed emulsion with etching ink, removing the water soluble portion of the emulsion and ink covering same to accurately reproduce the lines of the original drawing in the form of identical width clear lines on the surface of the glass, locating the negative thus formed in face contact with a photo-sensitive surface presented by a very thin emulsion coating on a sheet of template stock, exposing said last mentioned photo-sensitive surface to light passing through the clear lines of the glass negative to produce, after processing said photo-sensitive surface, an accurate ink line replica of the original drawing on the template stock, removing any ink lines desired from the layout thus photographically transferred to the template stock, coating the surface of the stock including the ink lines with shellac, subjecting said shellacked surface to a solvent of a nature to remove all ink line formations from said surface to expose the surface of the material forming said template stock, subjecting said surface to an etching solution to produce etched lines to a depth of two to three thousandths of an inch and identical in width to those of the original drawing, and thereafter fabricating the template stock in accordance with the etched lines formed in the surface thereof.

2. A process for photo-mechanically reproducing engineering drawings from lofts, master drawings and the like, which comprises coating a surface of a sheet of transparent size retaining material with a very thin emulsion of the ammonium dichromate type which is temporarily photo-sensitive, placing the emulsion side of said sheet of transparent material in face contact with the drawing to be reproduced, exposing the emulsion to light transmitted through the material and reflected from the drawing, whereby the emulsion contacting the lines of the drawings is rendered water soluble and the remaining emulsion water insoluble, rolling up the exposed emulsion with a backing material, removing the water soluble portion of the emulsion and backing material covering same to accurately reproduce the lines of the original drawing in the form of identical width clear lines on the surface of the transparent material, locating the negative thus formed in face contact with a photo-sensitive surface presented by a very thin emulsion coating on a sheet of template stock, exposing said last mentioned photo-sensitive surface to light passing through the clear lines of the transparent negative to produce, after processing said photo-sensitive surface, an accurate ink line replica of the original drawing on the template stock, removing any ink lines desired from the layout thus photographically transferred to the template stock, coating the surface of the stock including the ink lines with shellac, subjecting said shellacked surface to a solvent of a nature to remove all ink line formations from said surface to expose the surface of the material forming said template stock, subjecting said surface to an etching solution to produce etched lines identical in width to those of the original drawing, and thereafter fabricating the template stock in accordance with the etched lines formed in the surface thereof.

3. A process for photo-mechanically reproducing engineering drawings from lofts, master drawings and the like, which comprises coating a surface of a sheet of transparent glass with a very thin emulsion of the albumin ammonium dichromate type which is temporarily photo-sensitive and of a nature to form a transparent negative, placing the emulsion side of said sheet of glass in face contact with the drawing to be reproduced, exposing the emulsion to light transmitted through the glass and reflected from the drawing whereby the emulsion contacting the lines of the drawing is rendered water soluble and the remaining emulsion water insoluble, rolling up the exposed emulsion with an opaque backing material, flooding with water the entire exposed surface of the negative for a substantial period of time at least in the order of about 8 minutes to soak the emulsion so that no dry spots remain and thereafter while still flooded removing the water soluble emulsion and material covering same by a controlled spray of compressed air and water under a pressure of from about 25 to 90 pounds per square inch to accurately define the line between soluble and insoluble emulsion and thus reproduce the lines of the original drawing in the form of identical width clear lines on the surface of the glass, locating the negative thus formed in face contact with a photo-sensitive surface presented by a sheet of steel, glass and the like, exposing said last mentioned surface to light passing through the clear portions of the glass negative to produce, after processing said photo-sensitive surface, an accurate replica of the original drawing, said last mentioned photo-sensitive surface being such that the lines of said replica are defined by water insoluble material.

4. Those steps in the process of photo-mechanically transferring engineering drawings from lofts, master drawings and the like to a sheet of template stock by the contact method utilizing one or more negatives with transparent lines, which comprise coating said template stock with an emulsion of the ammonium dichromate type, of a nature to present a temporarily photo-sensitive surface, locating said negative in face contact with said surface, transmitting light through said transparent lines, and processing said surface to produce a positive reproduction of said loft drawing in the form of ink lines, coating said surface with a building up material, removing said lines and material covering same to expose the surface of said template stock, and etching said exposed line surfaces.

5. Those steps in the process of photo-mechanically transferring engineering drawings from lofts, master drawings and the like to a sheet of template stock by the contact method utilizing one or more negatives with transparent lines, which comprise temporarily masking out a portion of said transparent lines, spraying said template stock with an emulsion of the ammonium dichromate type, of a nature to present a temporrily photo-sensitive surface that may be handled and processed in normal factory light, locating said negative in face contact with said surface, transmitting light through said transparent lines, processing said surface to produce a positive reproduction of a portion of said loft drawing in the form of ink lines, coating said surface with a building up material, removing said lines and material covering same, to expose the surface of said template stock, and etching said exposed line surfaces.

6. The steps in the photo-mechanical production of a template, master drawing and the like from a plurality of reflex negatives having transparent lines, which comprise coating the surface of a single piece of template stock with an emulsion of the ammonium dichromate type to produce directly thereon a photo-sensitive surface, placing one of said negatives in face contact with a portion of said sensitized surface, transmitting light through the transparent lines of said negative to expose a portion of said surface, processing at least a portion of said exposed portion to produce a line positive on said surface, placing a second negative in face contact with an adjacent sensitized portion of said surface and with transparent lines in alignment with positive lines from the first negatives, to form when exposed and processed a line continuation of said positive formed on said surface by said first negative, all steps being carried out in normal light.

7. The steps in the photo-mechanical production of a template, master drawing and the like from a plurality of reflex negatives having transparent lines and cooperating target markings, which comprise coating the surface of a single piece of template stock with an emulsion of the ammonium dichromate type to produce directly thereon a photo-sensitive surface, placing one of said negatives in face contact with a portion of said sensitized surface, masking out the remainder of said surface, transmitting light through the transparent lines of said negative to expose a portion of said surface, processing said exposed portion to produce a line positive including target markings on said surface, placing a second negative having target markings in face contact with another unmasked and adjacent portion of said surface and in alignment with said target markings from the first negative, to form when exposed and processed a line continuation of said positive formed on said surface by said first negative, and processing the finished line layout on said surface to remove the lines and form etched lines in place thereof, preparatory to fabricating.

8. The seps in the photo-mechanical production of a template, master drawing and the like from a plurality of reflex negatives having transparent lines, which comprise spraying the surface of a single piece of template stock with an emulsion of the ammonium dichromate type to produce directly thereon a photo-sensitive surface of less than .001 thickness, placing one of said negatives in face contact with a portion of said sensitized surface, masking out the remainder of said surface, transmitting light through the transparent lines of said negative to expose a portion of said surface, processing said exposed portion to produce an ink line positive on said surface, placing a second negative in face contact with another unmasked and adjacent portion of said surface and in alignment with said positive ink lines from the first negative, to form when exposed and processed an ink line continuation of said positive formed on said surface by said first negative, and processing the finished ink line layout on said surface to remove the ink lines and form etched lines in place thereof, preparatory to fabricating.

9. A process for photo-mechanically reproducing engineering drawings from lofts, master drawings and the like, which comprises coating a surface of a sheet of transparent size retaining material with a very thin emulsion of the ammonium dichromate type which is temporarily photo-sensitive, placing the emulsion side of said sheet of glass in face contact with the drawing to be reproduced, exposing the emulsion to light transmitted through the glass and reflected from the drawing, whereby the emulsion contacting the lines of the drawing is rendered water soluble and the remaining emulsion water insoluble, rolling up the exposed emulsion with a backing material, removing the water soluble portion of the emulsion and material covering same to accurately reproduce the lines of the original drawing in the form of identical width clear lines on the surface of the glass, locating the negative thus formed in face contact with a photo-sensitive surface presented by a very thin emulsion coating on a sheet of template stock, exposing said last mentioned photo-sensitive surface to light passing through the clear lines of the glass negative to produce, after processing said photo-sensitive surface, an accurate line replica of soluble material of the original drawing on the template stock, removing any lines desired from the layout thus photographically transferred to the template stock, coating the surface of the stock including the lines with a backing material such as shellac, subjecting said shellacked surface to a solvent and then removing all line formations from said surface to expose the surface of the material forming said template stock, subjecting said surface to an etching solution to produce etched lines to a depth of two to three thousandths and identical in width to those of the original drawing, and thereafter fabricating the template stock in accordance with the etched lines formed in the surface thereof.

References Cited in the file of this patent

UNITED STATES PATENTS

| | | |
|---|---|---|
| 1,436,125 | Ullman | Nov. 21, 1922 |
| 1,436,629 | Ullman | Nov. 21, 1922 |
| 1,484,347 | Ullman | Feb. 19, 1924 |
| 1,645,112 | Miller | Oct. 11, 1927 |
| 2,122,404 | Bloom | July 5, 1938 |
| 2,172,970 | Ford | Sept. 12, 1939 |
| 2,311,547 | Hutchison | Feb. 16, 1943 |

FOREIGN PATENTS

| | | |
|---|---|---|
| 7,800 | Great Britain | Jan. 6, 1910 |
| 391,493 | Great Britain | May 1, 1933 |